3,255,180
N-ACETYL-7-DEHYDRO-1-DEOXY-3,4-O-ISOPROPYLIDENELINCOSAMINE

Herman Hoeksema, Cooper Township, Kalamazoo County, Mich., assignor to The Upjohn Company, Kalamazoo, Mich., a corporation of Delaware
No Drawing. Filed Apr. 13, 1964, Ser. No. 359,491
1 Claim. (Cl. 260—210)

The present invention relates to a novel compound and is more particularly concerned with N-acetyl-7-dehydro-1-deoxy-3,4-O-isopropylidenelincosamine [6-acetamido-1,5 - anhydro - 6,8-dideoxy-3,4-O-isopropylidene-D-glycero-D-galacto-7-octulose] (II) and a method for the preparation thereof.

The novel compounds of this invention and the process for the production thereof can be illustratively represented in the following manner:

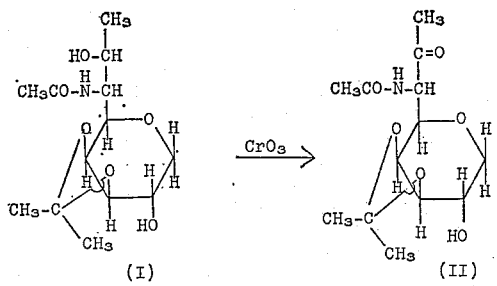

The process of the present invention comprises: oxidizing N-acetyl-3,4-O-isopropylidene-1-deoxylincosamine (I) with chromium trioxide in pyridine to give N-acetyl-7-dehydro-1-deoxy-3,4-O-isopropylidenelincosamine (II).

The novel N-acetyl-7-dehydro-1-deoxy-3,4-O-isopropylidenelincosamine (II) is an important intermediate in the production of antimicrobial compounds on account of the carbonyl moiety, which can react with carbonyl reactants such as hydroxylamine, hydrazine, phenylhydrazine, and the like. For example, N-acetyl-7-dehydro-1-deoxy-3,4-O-isopropylidenelincosamine, upon heating in aqueous alcoholic solution with phenylhydrazine, gives the phenylhydrazone of N-acetyl-7-dehydro-3,4-O-isopropylidenelincosamine (III), which can be converted in 50% aqueous ethanol with 1-fluoro-2,4-dinitrobenzene in the presence of sodium carbonate to the (2,4-dinitrophenyl)-phenylhydrazone of N-acetyl-3,4-O-isopropylidene-1-deoxy-7-dehydrolincosamine (IV). Compound IV is an active antifungal compound which can be used against *Venturia inaequalis*, which is the cause of the common apple scab; against Botrytis, causing grey mold and pot rot, particularly in house plants; and against *Alternaria solani*, which attacks tomato plants. Compound IV is therefore useful in powders and sprays to be applied on plants, such as tomato plants, common house plants, and apple trees.

The starting material, N-acetyl-3,4-O-isopropylidene-1-deoxylincosamine, is a new product, the synthesis of which is disclosed in the preparations.

In carrying out the process of the present invention N-acetyl-3,4-O-isopropylidene-1-deoxylincosamine is oxidized with an excess of chromium trioxide in pyridine. The reaction is preferably conducted at about room temperature, between 20 and 30° C.; however, temperatures between 0 and 50° are operative. The desired product, N - acetyl - 1-deoxy-7-dehydro-3,4-O-isopropylidenelincosamine, is isolated by conventional means, such as by evaporation of the solvent, extraction, recrystallization, counter-current distribution, and the like.

The following preparations and examples are illustrative of the process and products of the present invention, but are not to be construed as limiting.

PREPARATION 1
Methyl thiolincosaminide

A solution of 4 g. of lincomycin [U.S. Patent 3,086,912] in 20 ml. of hydrazine hydrate (98–100%) was refluxed for 21 hours; excess hydrazine hydrate was then removed in vacuo under nitrogen at steam bath temperature to give as residue a pasty mass of crystals. This residue was cooled, acetonitrile was added, and the mixture was stirred until the crystals were suspended. The crystals were collected on a filter, washed with acetonitrile and with ether. The yield of white, crystalline methyl thiolincosaminide after drying in vacuo at room temperature was 2.1 g. (84%). Recrystallization was accomplished by dissolving methyl thiolincosaminide in hot dimethylformamide and adding an equal volume of ethylene glycol dimethyl ether.

Methyl thiolincosaminide has the following physical and chemical characteristics: a melting point of 225–228° C.; an optical rotation of $[\alpha]_D^{25}$ +276° (c.=.768 in water); and a pKa' of 7.45.

*Analysis.*—Calcd. for $C_9H_{19}NO_5S$: C, 42.7; H, 7.56; N, 5.53; S, 12.66. Found: C, 42.6; H, 7.49; N, 5.75; S, 12.38.

PREPARATION 2
Methyl N-acetylthiolincosaminide

Five grams of methyl thiolincosaminide (about 0.02 mole) was suspended with stirring in 50 ml. of methanol and treated with 4.04 g. (about 0.04 mole) of acetic anhydride. The starting material dissolved almost completely, and thereafter the mixture became solid. After 18 hours at room temperature (about 25° C.), the solid was filtered, washed with methanol, and dried in a vacuum oven at 50° C. and 15 mm. pressure; yield, 4.58 g. (79%) of crystalline product of melting point 242–245° C. This product was recrystallized from absolute methanol to give colorless needles of methyl N-acetylthiolincosaminide of melting point 243–245° C. and rotation $[\alpha]_D$ in water of +265°, c.=0.7374; and $[\alpha]_D$ in 95% ethanol of +248°, c.=0.6124.

*Analysis.*—Calcd. for $C_{11}H_{21}O_6NS$: C, 44.72; H, 7.17; N, 4.74; S, 10.85. Found: C, 44.87; H, 7.10; N, 4.65; S, 10.99.

In the manner shown in Preparation 2, other acyl derivatives of methyl thiolincosaminide can be made, using anhydrides of other hydrocarbon carboxylic acids, such as propionic anhydride, butyric anhydride, valeric anhydride, hexanoic anhydride, benzoic anhydride, phenylacetic anhydride, and phenylpropionic anhydride, and the like. Representative methyl N-acylthiolincosaminides thus obtained include methyl N-propionyl-, N-butyryl-, N-valeryl-, N-hexanoyl-, N-benzoyl-, N-phenylacetyl-, N-phenylpropionylthiolincosaminide, and the like.

PREPARATION 3
Methyl N-acetyl-3,4-O-isopropylidenethiolincosaminide

A suspension of 5.3 g. of finely powdered methyl N-acetylthiolincosaminide was stirred for 60 hours at room temperature with 500 ml. of acetone and 0.5 ml. of concentrated sulfuric acid. Most of the starting material was still undissolved at this time, so an additional 5 ml. of concentrated sulfuric acid was added; solution quickly resulted. The solution was stirred for 30 minutes at room temperature and added to a suspension of 150 g. of barium carbonate in 100 ml. of water. The mixture was stirred until neutral, barium sulfate and excess carbonate were removed by filtration, and the precipitate was washed with acetone. The filtrate and washings were combined and evaporated to dryness in vacuo at 50° C. to give a residue. The residue was treated with acetone-ether (10:1) and insoluble materials were removed by filtration. The filtrate was evaporated to dryness and the residue was dissolved in 100 ml. of ethanol. Removal of the alcohol by heating in vacuo left a yellow gum which was dissolved in 20 ml. of warm water containing a small amount of sodium carbonate. Some insoluble material was removed by filtration and the filtrate was cooled. The crystals which formed were collected after standing in the refrigerator for 4 hours, washed with cold water and dried in vacuo; yield of methyl N-acetyl-3,4-O-isopropylidenethiolincosaminide, 2 g. A portion of the crystals, recrystallized from water, gave pure methyl N-acetyl-3,4-O-isopropylidenethiolincosaminide of melting point 174–175° C.; rotation, $[\alpha]_D^{25}$ +189° (c.=0.4136, water).

*Analysis.*—Calcd. for $C_{14}H_{25}NO_6S$: C, 50.2; H, 7.52; N, 4.17; S, 9.55. Found: C, 49.87; H, 7.46; N, 4.11; S, 9.56.

In the manner given in Preparation 3, substituting methyl N-acetylthiolincosaminide by other methyl N-acylthiolincosaminides, results in the corresponding methyl N-acyl-3,4-isopropylidenethiolincosaminides such as methyl N-propionyl-, N-butyryl-, N-valeryl-, N-hexanoyl-, N-benzoyl-, N-phenylacetyl-, N-phenylpropionyl-3,4-isopropylidenethiolincosaminide and the like.

PREPARATION 4

*N-acetyl-3,4-O-isopropylidene-1-deoxylincosamine*

Fifteen grams (0.054 mole) of methyl N-acetyl-3,4-O-isopropylidenethiolincosaminide was heated under reflux for 7 hours with 100 ml. of loosely packed, Raney nickel in 500 ml. of ethanol. The mixture was thereupon filtered and the catalyst was washed with a total of 1 liter of boiling ethanol. The filtrate and washings were combined and evaporated to dryness, leaving a partially crystalline residue. This residue was purified by counter-current distribution, 200 transfers, in a system consisting of 1-butanol:water. A major fraction, K=0.48, yielded on evaporation a white crystalline solid; melting point, 220–235° C. with decomposition; rotation, $[\alpha]_D$ +70° (c.=1, 50% ethanol). This material had an analysis as follows:

*Analysis*—Calcd. for $C_{13}N_{23}NO_6$: C, 53.96; H, 8.09; N, 4.84. Found: C, 53.87; H, 8.23; N, 4.92.

In similar manner, other methyl N-acyl-3,4-O-isopropylidenethiolincosaminides yields by this process the corresponding N-acetyl-3,4-O-isopropylidene-1-deoxylincosamines. Representative N-acyl-3,4-O-isopropylidene-1-deoxylincosamines thus produced include: N-propionyl-, N-butyryl-, N-valeryl-, N-hexanoyl-, N-benzoyl-, N-phenylacetyl-, N-phenylpropionyl-3,4-O-isopropylidene-1-deoxylincosamine and the like.

EXAMPLE 1

*N-acetyl-3,4-O-isopropylidene-1-deoxy-7-dehydrolincosamine (II)*

To a solution of 1 g. (0.0034 mole) of N-acetyl-3,4-O-isopropylidene-1-deoxylincosamine in 10 ml. of pyridine and 1 ml. of water was added 1 g. (0.0066 mole) of chromium trioxide in 7 ml. of pyridine and 1 ml. of water. The mixture was stirred overnight and added to a solution of 125 ml. of ether and 125 ml. of ethyl acetate. After standing 3 hours, this mixture was filtered and the filtrate was evaporated to dryness to give a crystalline residue which was stirred with acetone and dried; yield, 225 mg. of crystalline N-acetyl-3,4-O-isopropylidene-1-deoxy-7-dehydrolincosamine. An additional 50 mg. was recovered from the acetone residue by counter-current distribution in a system consisting of 1-butanol:water; the K value for this fraction was 0.78. On combination and recrystallization from acetone, a total of 185 mg. of product was obtained; M.P., 205–210° C.

*Analysis.*—Calcd. for $C_{13}H_{21}NO_6$: C, 54.34; H, 7.37; N, 4.88. Found: C, 54.39; H, 7.59; N, 5.06.

The thus-obtained N-acetyl-3,4-O-isopropylidene-1-deoxy-7-dehydrolincosamine gave a positive iodoform test. Upon treatment of the product with sodium borohydride in methanol, the iodoform test was negative.

EXAMPLE 2

*N-acetyl-3,4-O-isopropylidene-1-deoxy-7-dehydrolincosamine*

To a solution of 1 g. of N-acetyl-3,4-O-isopropylidene-1-deoxylincosamine in 10 ml. of glacial acetic acid was added 1 g. (0.0066 mole) of chromium trioxide in 10 ml. of acetic acid. The mixture was warmed to 35° C. and stirred overnight at room temperature. It was then added to 250 ml. of a solution of ethyl acetate and ether (1:1), and filtered. The filtrate was evaporated to dryness and the residue slurried with acetone to give 40 mg. of white crystals of N-acetyl-3,4-O-isopropylidene-1-deoxy-7-dehydrolincosamine, identical with the material obtained from Example 1.

I claim:

N-acetyl-3,4-O-isopropylidene-1-deoxy-7-dehydrolincosamine of the formula:

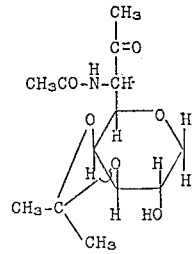

References Cited by the Examiner

Burton et al.: "Chemistry and Industry," Feb. 11, 1961, page 175.

LEWIS GOTTS, *Primary Examiner.*

JOHNNIE R. BROWN, *Assistant Examiner.*